(12) United States Patent
Billeci et al.

(10) Patent No.: US 7,146,520 B2
(45) Date of Patent: Dec. 5, 2006

(54) METHOD AND APPARATUS FOR CONTROLLING CLOCKS IN A PROCESSOR WITH MIRRORED UNITS

(75) Inventors: Michael Billeci, Poughkeepsie, NY (US); Timothy G. McNamara, Fishkill, NY (US); Ching-Lung L. Tong, Highland Mills, NY (US); David Webber, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 10/436,210

(22) Filed: May 12, 2003

(65) Prior Publication Data

US 2004/0230857 A1 Nov. 18, 2004

(51) Int. Cl.
  *G06F 1/04* (2006.01)
  *G06F 1/14* (2006.01)
(52) U.S. Cl. ............ 713/502; 713/500; 713/400; 713/600

(58) Field of Classification Search ............ None
See application file for complete search history.

(56) References Cited

U.S. PATENT DOCUMENTS

| | | | | |
|---|---|---|---|---|
| 5,231,640 A | * | 7/1993 | Hanson et al. | 714/54 |
| 5,452,443 A | * | 9/1995 | Oyamada et al. | 714/10 |
| 5,668,985 A | * | 9/1997 | Carbine et al. | 712/245 |
| 5,692,121 A | | 11/1997 | Bozso et al. | 395/182.11 |
| 5,802,359 A | | 9/1998 | Webb et al. | 395/568 |
| 5,948,111 A | * | 9/1999 | Taylor et al. | 714/10 |

* cited by examiner

*Primary Examiner*—James K. Trujillo
(74) *Attorney, Agent, or Firm*—Cantor Colburn LLP

(57) ABSTRACT

A method and apparatus for operating a clock in a processor having asymmetrically mirrored base-mirror units is disclosed. The method includes initializing a base-unit and a mirror-unit of the processor to the same state, and starting the mirror-unit-clock one clock cycle later than the base-unit-clock.

9 Claims, 15 Drawing Sheets

| CASE | GPTR1 START ONE CYCLE LATE | GPTR2 STOP SAME CYCLE | OUTPUT |
|---|---|---|---|
| CASE I | 1 | 0 | FIG. 6 |
| CASE II | 1 | 1 | FIG. 7 |
| CASE III | 0 | DC | FIG. 8 |

TABLE
FIG. 5

CASE I

CASE II

METHOD AND APPARATUS FOR CONTROLLING CLOCKS IN A PROCESSOR WITH MIRRORED UNITS

RELATED APPLICATIONS

The present application is related to the co-pending U.S. patent application Ser. No. 10/435,914 entitled "Method And Apparatus For Mirroring Units Within A Processor" filed by Michael Billeci, Timothy J. Slegel and Chung-Lung K. Shum, now U.S. Pat. No. 7,082,550.

The co-pending application and the present application are owned by one and the same assignee, International Business Machines Corporation of Armonk, N.Y. The descriptions set forth in the co-pending application are hereby incorporated into the present application by this reference.

Trademarks: IBM® is a registered trademark of International Business Machines Corporation, Armonk, N.Y., U.S.A. S/390, Z900 and z990 and other product names may be registered trademarks or product names of International Business Machines Corporation or other companies.

BACKGROUND OF THE INVENTION

The present disclosure relates generally to a method and apparatus for controlling clocks in a processor having mirrored units, and particularly to a method and apparatus for controlling clocks in mirrored instruction and execution units within a processor, thereby preserving valuable real estate at the processor core level while providing processor checking capability.

Errors may occur in computer hardware that may be transient errors occurring once, randomly, or never again, or they may be "hard" errors, such as when a hardware component breaks and stays broken. Given that hardware can have errors, it is necessary that these errors can be detected. The duplication of instruction and execution units, I-units and E-units, respectively, within the core of a processor chip of a computer system to provide fault detection is well known, where the duplicated units include duplicate instances referred to as base-units and mirrored-units. The outputs of each of these units are sent to a recovery unit (R-unit) where the values of both are compared. A mismatch indicates a hardware fault and the appropriate error recovery action is taken. The outputs of the base and mirror units are also compared in a buffer control element (BCE), with detected errors being forwarded to the R-unit to initiate the appropriate recovery action.

In a processor that implements error detection, the first goal should be protecting the integrity of the data. That is to say, the processor should not allow a "wrong" answer to propagate undetected. At the very least, the processor should checkstop, or present a machine check to the operating system to inform that an error has been detected. More sophisticated processors will implement some type of recovery scheme, such that when an error is detected, the processor will back-up to the last known good instruction and retry the failing operation. The hardware constructs required to provide this level of detection come at a cost in terms of extra circuits, which impacts wireability and cycle time. Some processors will intersperse the error detection logic in with the functional logic. An undesirable result of this implementation is that the required silicon area increases with the amount of error detection. Also, some of the error detection logic can be quite complex, which greatly adds to the development time and cost. To overcome these disadvantages, some processors duplicate sections of logic, and even duplicate entire functional units. In a duplicate implementation, the surrounding units look for discrepancies in the results generated by the duplicated units. This duplicate implementation is desirable in that it decreases complexity and thereby decreases development time, but comes at the cost of increased silicon area, where full duplication will double the silicon area required. Since the duplicated units each need to communicate with the other functional units, they must all be floorplanned close together. This increases wire congestion in the core of the processor increases wire length, and decreases processor frequency.

As cycle time requirements of the processor become more and more aggressive, reaching in excess of 1 Giga-Hertz (GHz), the connecting wires between the mirror units, which are used only for error checking, and other units must be short, thereby requiring that the mirror units be floorplanned at the core level close to the base units, R-unit, and BCE. Also, the mirror-units along with the base-units must be floorplanned in the middle of the processor core. As a result, it is becoming more and more difficult to manage the resulting wire congestion at the core level. Accordingly, there is a need in the art for an improved method and apparatus for mirroring units within a processor and for controlling clocks in the processor with mirrored units.

SUMMARY OF THE INVENTION

In one embodiment, a method of operating a clock in a processor having asymmetrically mirrored base-mirror units includes initializing a base-unit and a mirror-unit of the processor to the same state, and starting the mirror-unit-clock one clock cycle later than the base-unit-clock.

In another embodiment, a controller for controlling the operation of a clock in a processor having asymmetrically mirrored base-mirror units, includes a start-clock input, a first register input, a second register input, a base-unit-clock output for controlling a base-unit-clock, and a mirror-unit-clock output for controlling a mirror-unit-clock. The mirror-unit-clock is adapted to start and stop one cycle later than the base-unit-clock in response to the start-clock being active and the first register input being different from the second register input.

In a further embodiment, a combination of a clock controller and a processor responsive thereto is disclosed. The processor includes a base-unit for providing an output signal in response to an input signal, a mirror-unit for providing an output signal in response to the input signal, the mirror-unit being a duplicate of the base-unit, a first staging register disposed at the input to the mirror-unit for delaying the input signal thereto by at least one clock cycle, a second staging register disposed at the output of the mirror-unit for delaying the output signal therefrom by at least one clock cycle, and a recovery-unit in signal communication with the base and mirror units, the recovery unit having a comparator for comparing the output signals of the base and mirror units, the recovery unit further having third and fourth staging registers serially disposed between the output of the base-unit and the input of the comparator for delaying the input signal thereto by at least two clock cycles. The clock controller includes a clock input, a first test register input, and a second test register input, a base-unit-clock output for controlling a base-unit-clock, and a mirror-unit-clock output for controlling a mirror-unit-clock. The base-unit-clock is adapted to increment the state of base-unit, the first staging register, the third staging register, and the fourth staging register, and the mirror-unit-clock is adapted to increment the state of the mirror-unit and the second staging register.

BRIEF DESCRIPTION OF THE DRAWINGS

Referring to the exemplary drawings wherein like elements are numbered alike in the accompanying Figures:

FIG. 5 depicts a logic table for use with the exemplary clock controller of FIG. 3;

DETAILED DESCRIPTION OF THE INVENTION

An embodiment of the invention provides a processor with asymmetrical mirroring of units and a clock controller for controlling the clocks of the asymmetrically mirrored units, thereby preserving valuable processor real estate.

Figure 1:
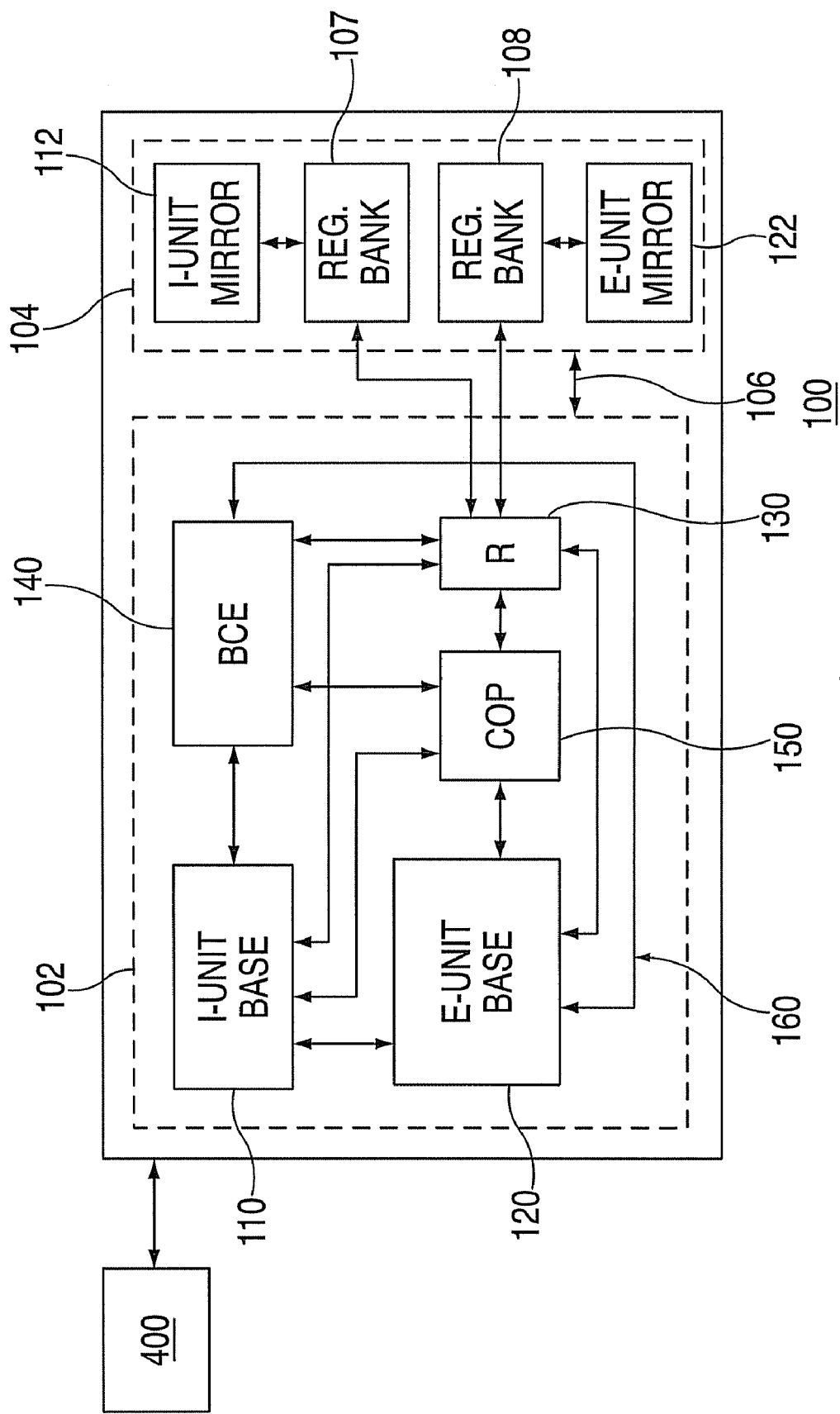
FIG. 1 depicts a one-line diagram of an exemplary processor for implementing an embodiment of the invention.

FIG. 1 is an exemplary embodiment of a processor 100 that may be employed in a server, for example, in combination with a clock controller 400. In alternative embodiments, clock controller 400, which is discussed below in reference to FIG. 3, may be integral with or separate from processor 100. Within processor 100 is a base functional core 102 and a non-functional instance area 104, with communication occurring between the two areas as depicted generally at signal path 106. Base functional core 102 includes base units of duplicated units, and non-duplicated units. A duplicated unit is a unit, such as an instruction-base-unit (I-base-unit) 110 or an execution-base-unit (E-base-unit) 120, that is instantiated twice for purposes of error detection. The first instance of a duplicated unit is referred to as a base unit and the second instance is referred to as a mirror unit, which are discussed further below. A non-duplicated unit is a unit, such as a recovery-unit (R-unit) 130, a buffer control element (BCE) 140, or a compression-unit (COP) 150, that is not copied for error detection. Non-duplicated units are often used for comparing the results of duplicated units. Within base functional core 102, I-base-unit 110 provides a decoded instruction on an instruction fetch, E-base-unit 120 executes an issued instruction, R-unit 130 holds the machine state and provides system data in the event of an error, BCE 140 serves as a cache and cache controller, and COP 150 implements data compression and character translation, with interconnecting signal paths 160 depicted in one-line diagram form. In addition to base units, a duplicated unit includes a mirror unit, such as I-mirror-unit 112 and E-mirror-unit 122, which are non-functional instances of the respective duplicated unit used for error detection. In accordance with the above, exemplary duplicated units include I-units and E-units, with I-base-unit 110 and I-mirror-unit 112, and with E-base-unit 120 and E-mirror-unit 122, respectively. In an embodiment, non-functional instance area 104 also includes staging registers 107, 108, which will be discussed below in reference to FIG. 2. The communication between base units 110, 120, mirror units 112, 122 and non-duplicated units, such as R-unit 130, will now be discussed with reference to FIG. 2.

Figure 2:
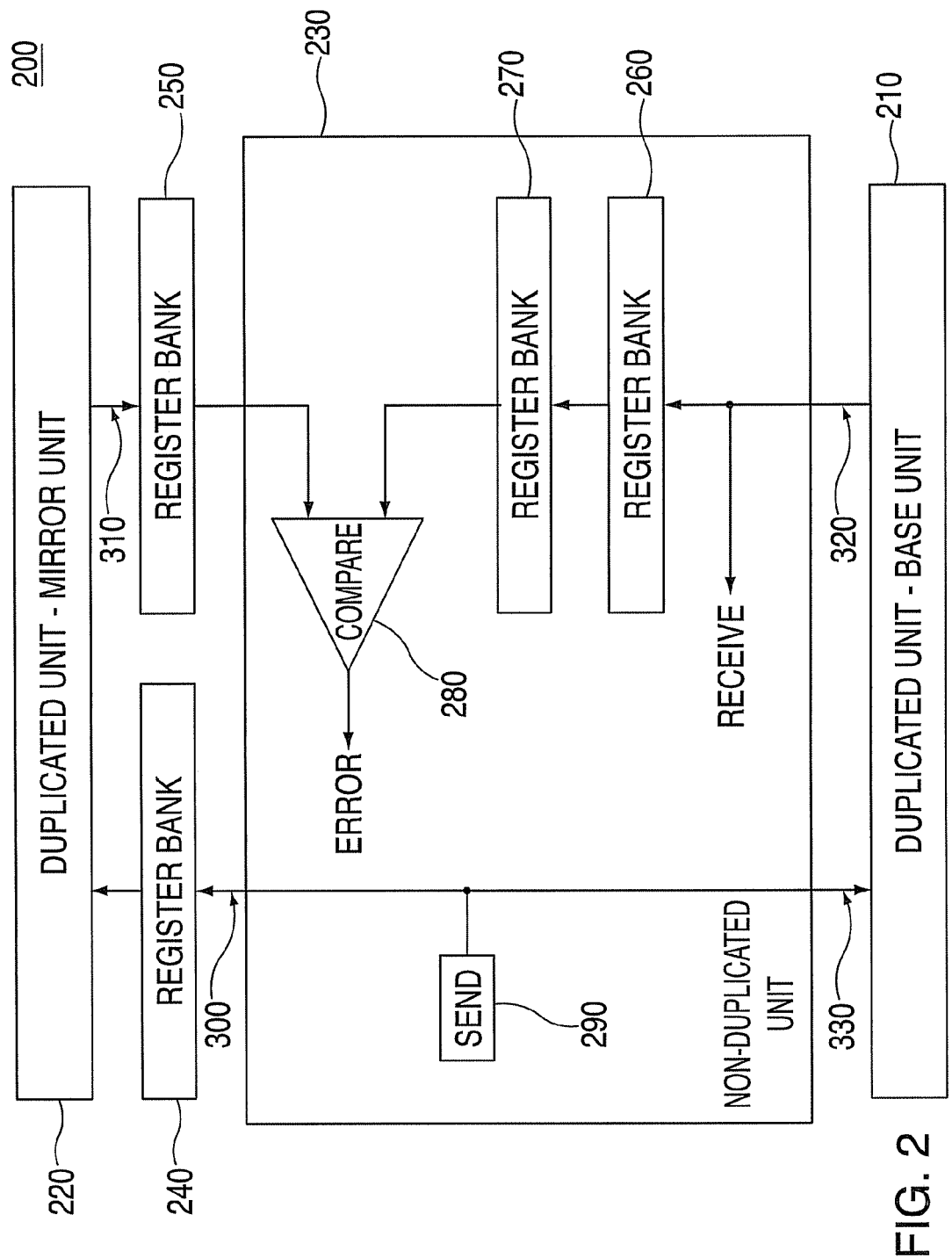
FIG. 2 depicts an exemplary base-mirror arrangement in accordance with an embodiment of the invention for use in the exemplary processor of FIG. 1.

FIG. 2 depicts a base-mirror arrangement 200 of a duplicated unit having a base-unit 210, a mirror-unit 220, a non-duplicated-unit 230 (also referred to as an R-unit 230 and depicted as R-unit 130 in FIG. 1), a first staging register 240 disposed in the input signal path 300 to mirror-unit 220, and a second staging register 250 disposed in the output signal path 310 from mirror-unit 220. In an embodiment, staging registers 240, 250 are floorplanned at the core level of processor 100, while the signals between base-unit 210 and R-unit 230 are connected directly. As illustrated, FIG. 2 depicts base-mirror arrangement 200 in one-line diagram form, however, staging registers 240, 250 represent staging registers on all inputs and outputs of mirror-unit 220, as depicted by register banks 107, 108 in FIG. 1. Base-mirror arrangement 200 may apply to a duplicated I-unit, where base-unit 210 would represent an instruction-base-unit 110 and mirror-unit 220 would represent an instruction-mirror-unit 112. Alternatively, base-mirror arrangement 200 may apply to a duplicated E-unit, where base-unit 210 would represent an execution-base-unit 120 and mirror-unit 220 would represent an execution-mirror-unit 122. In either arrangement, non-duplicated-unit 230 would represent an R-unit 130. In an embodiment of the invention, processor 100 includes base-mirror arrangements 200 for each I-unit 110 and E-unit 120.

R-unit 230 includes third and fourth intra-unit staging registers 260, 270 serially disposed in the output signal path 320 of base-unit 210, which serve to realign input signals between base-unit 210 and mirror-unit 220, since the mirror-units signals were delayed as discussed above. Also included in R-unit 230 is a comparator 280 disposed to receive signals from the mirror-unit output signal path 310, via second staging register 250, and from the base-unit output signal path 320, via third and fourth staging registers 260, 270, to provide fault detection through signal comparison. A mismatch in machine state detected at comparator 280 indicates a hardware fault, with appropriate error recovery action being taken.

Figure 3:
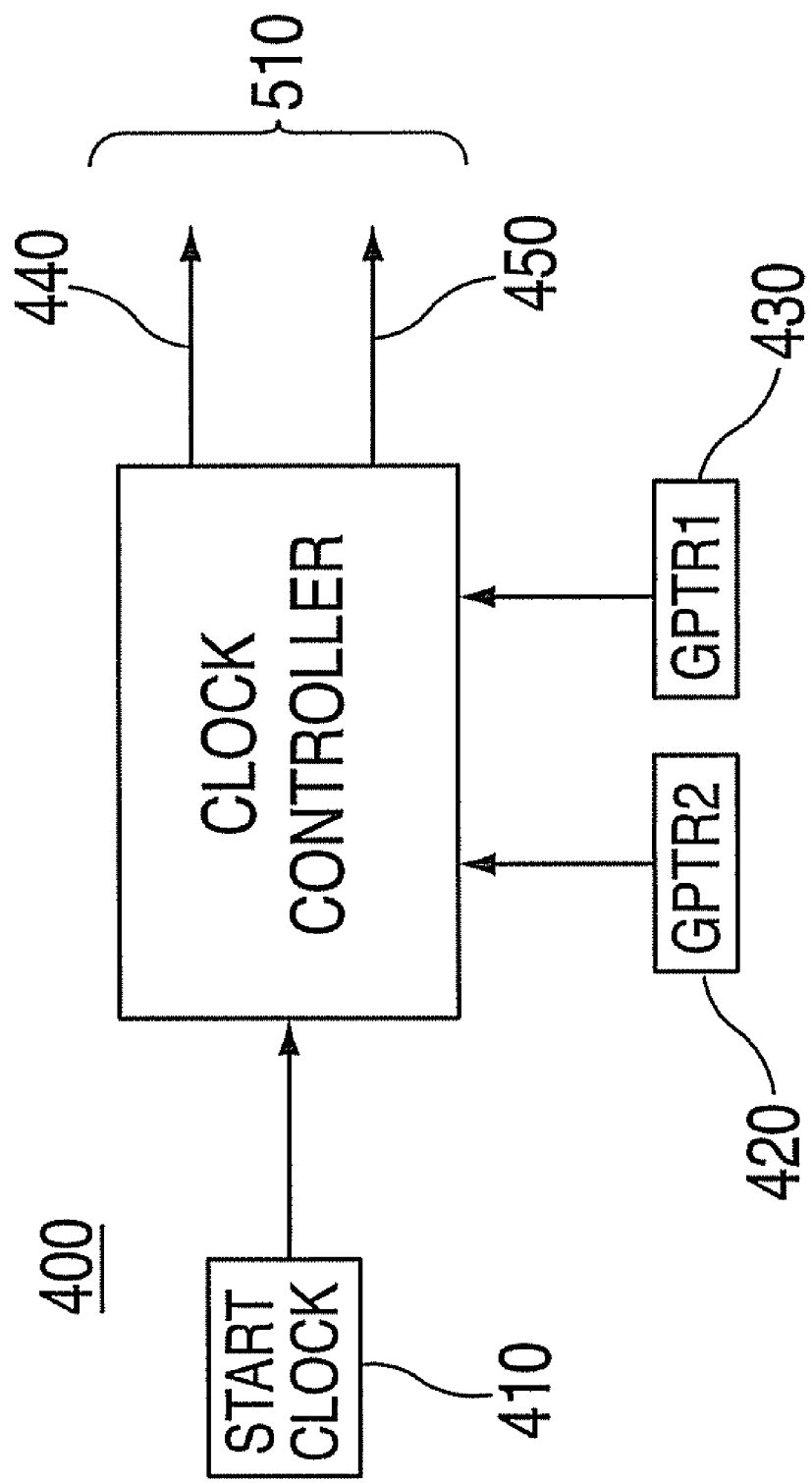
FIG. 3 depicts an exemplary clock controller in accordance with an embodiment of the invention.
Figure 4:
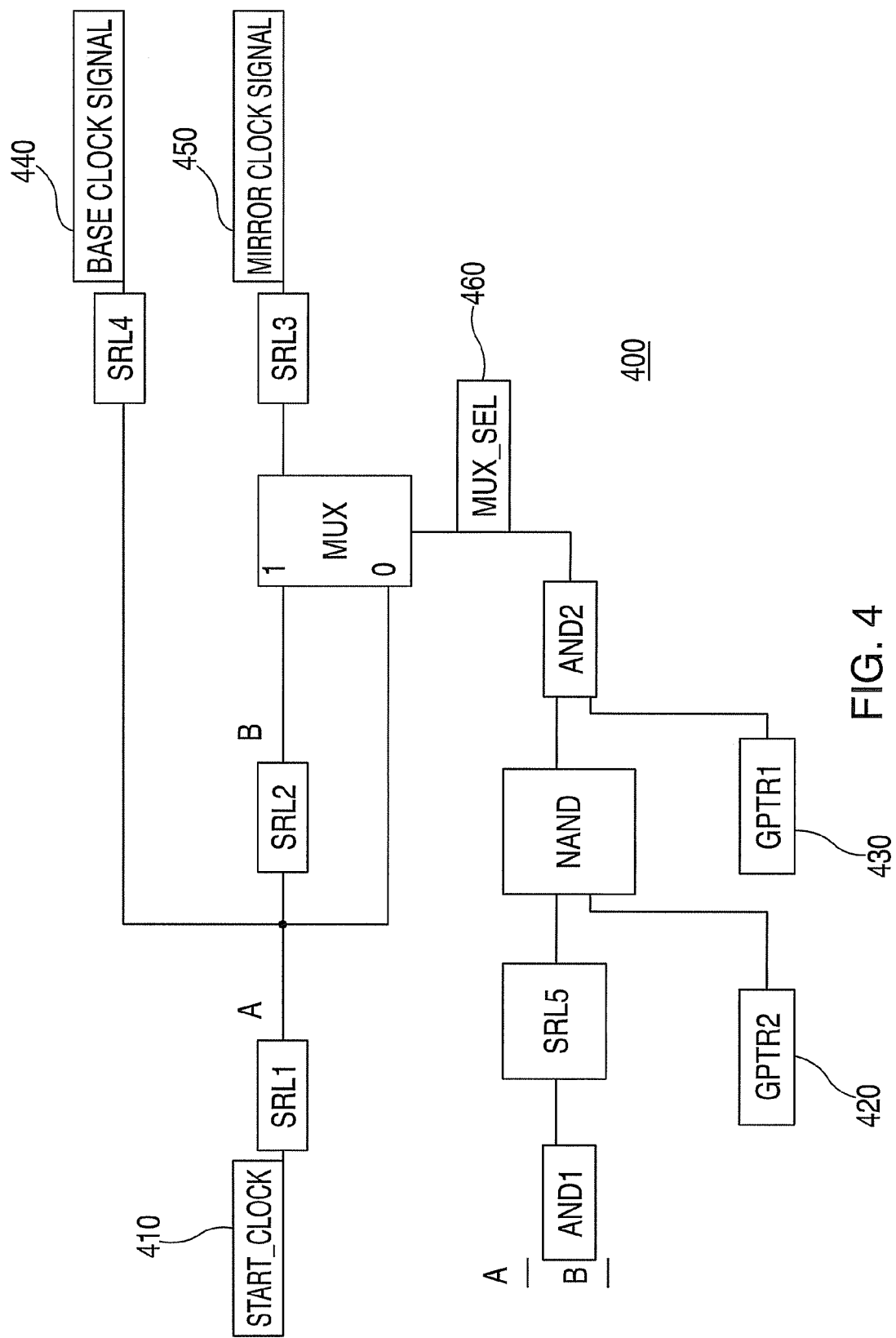
FIG. 4 depicts further detail of the exemplary clock controller of FIG. 3.

FIG. 3 depicts an exemplary clock controller 400 for controlling the operation of a clock, such as a base-unit-clock that starts and stops base-unit 210, or a mirror-unit-clock that starts and stops mirror-unit 220, for example, in processor 100. The actual base-unit and mirror-unit clocks control latches embedded within base-unit 210 and mirror-unit 220 that start and stop clock cycling of base-unit 210 and mirror-unit 220 when activated or de-activated by an input signal, as will be discussed in more detail below. Clock controller 400 includes a start-clock input 410, a first general purpose test register (GPTR1) input 430, a second general purpose test register (GPTR2) input 420, a base-unit-clock output (providing a base-clock-signal to clock a base-unit-clock) 440, and a mirror-unit-clock output (providing a mirror-clock-signal to clock a mirror-unit-clock) 450. As used herein, the terms base-unit-clock and base-clock-signal are used interchangeably with reference to numeral 440 and the terms mirror-unit-clock and mirror-clock-signal are used interchangeably with reference to numeral 450, however, the artisan will appreciate that each unit-clock is being clocked by its respective clock-signal. A more detailed version of clock controller 400 is depicted in FIG. 4, where logical operators are denoted by their logical operation name, such as SRL (Shift Register Latch), AND (logical AND operation), NAND (logical NAND operation), and MUX (MUX is a logical selector whose one output that feeds SRL3 can be one of two inputs, signal labeled A from SRL1 or signal labeled B from SRL2 depending on the state of the control signal labeled mux-sel. Referring to FIG. 4, the signal labeled B will be sent to the output signal of MUX when the signal mux-sel is a logical 1, and the input labeled A will be sent to the output signal of MUX when the signal mux-sel is a logical 0.), and labels A and B denote the signals that are input into the AND1 operator as well. A numeral after a logical operator type serves to distinguish one logical operator from another of the same type.

Figure 6:
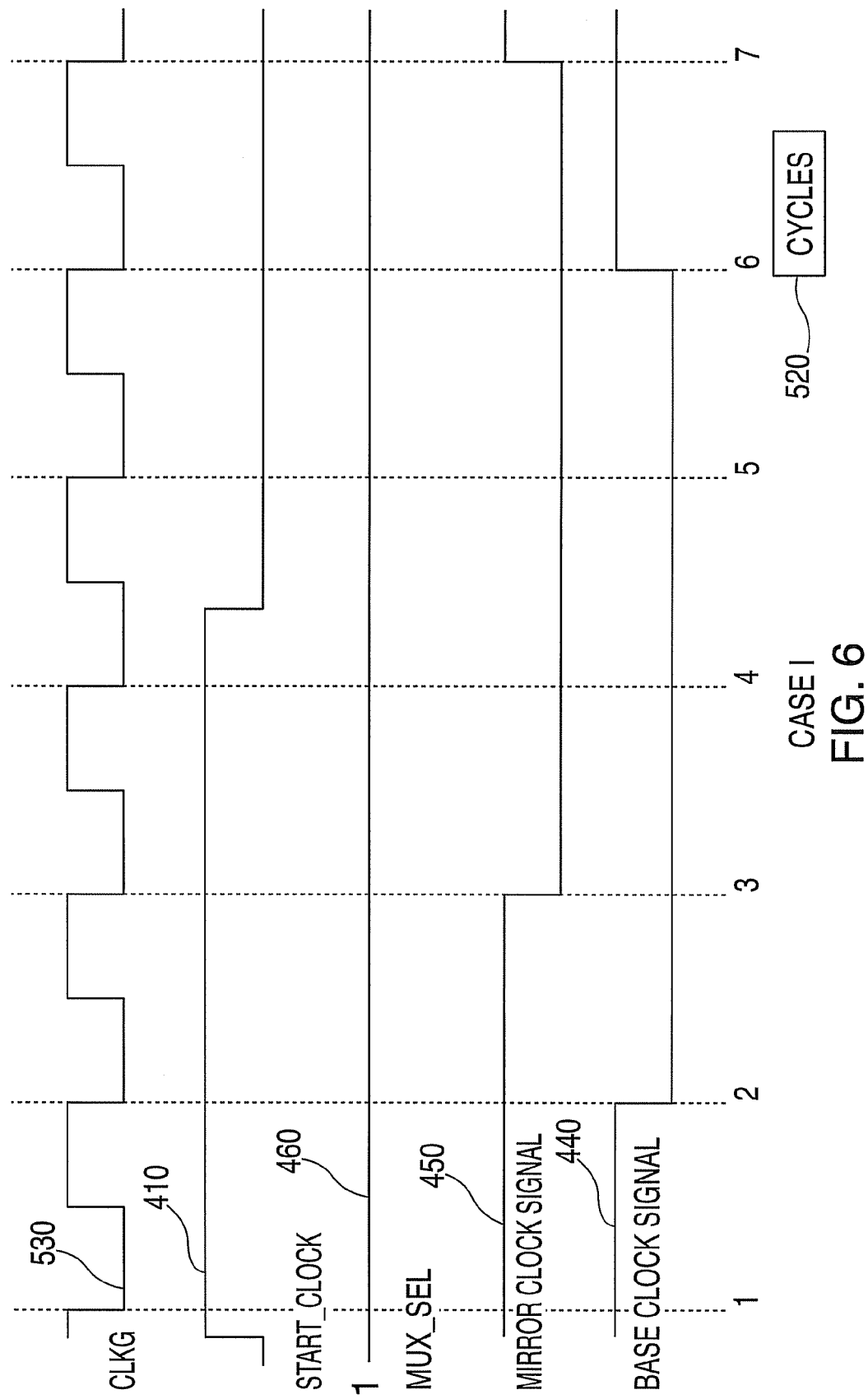
FIGS. 6–8 depict clocking signals relating to the logic table of FIG. 5.
Figure 7:
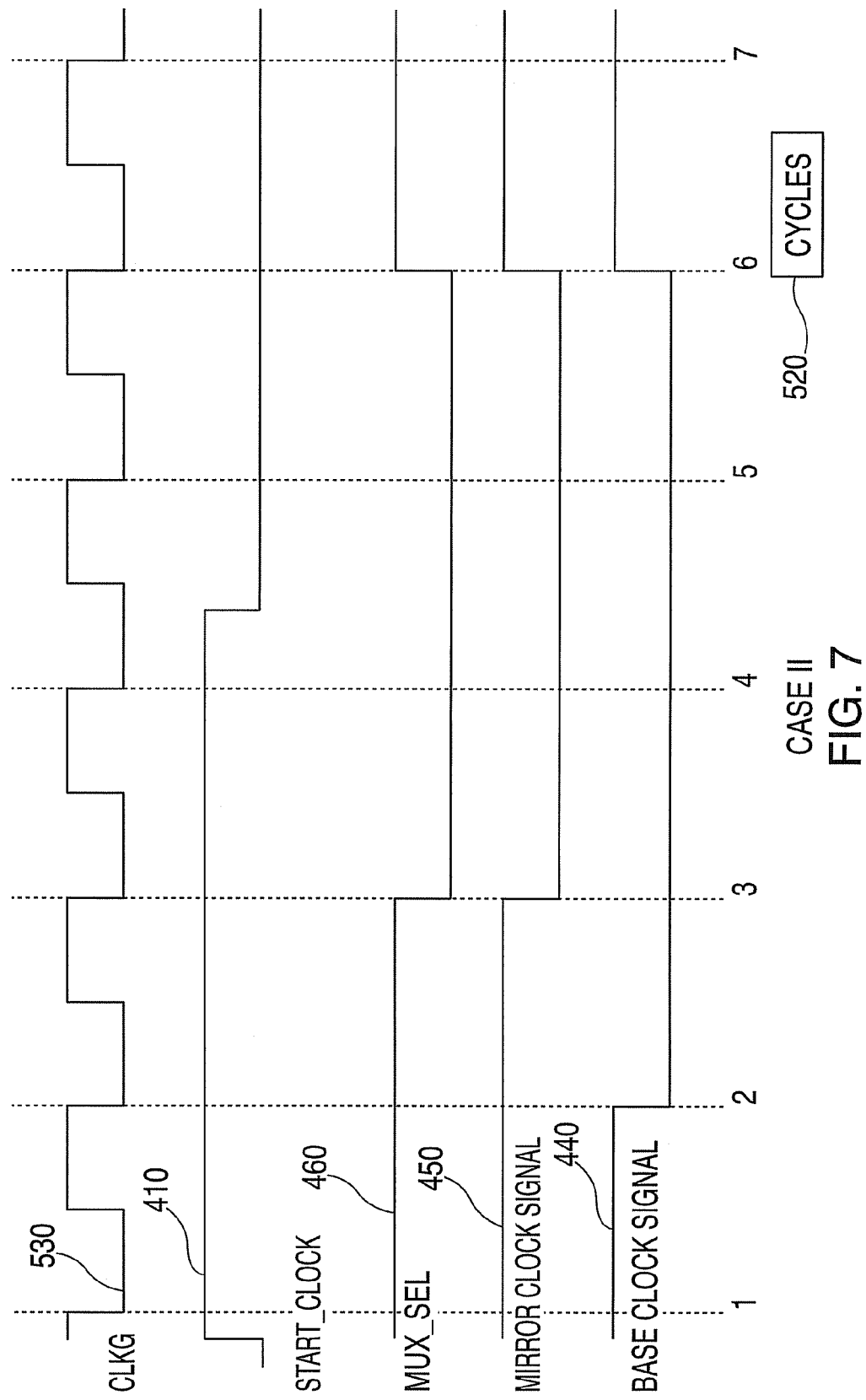
Figure 8:
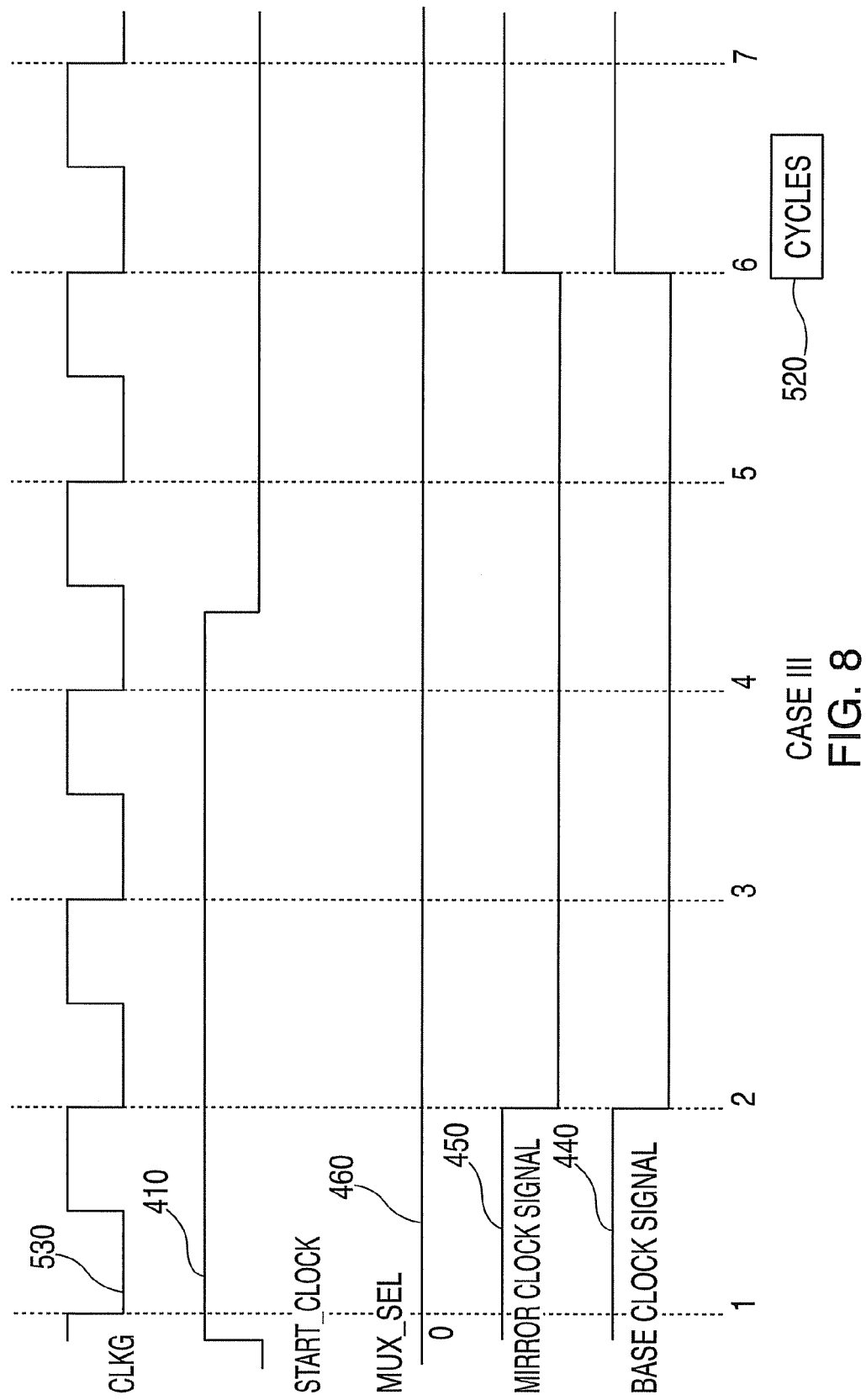

Base-clock-signal 440 serves to control the clocking of base-unit 210 and mirror-clock-signal 450 serves to control the clocking of mirror-unit 220, with both output signals 440, 450 controlling the clocking in response to the various input signals at start-clock 410, GPTR1 430 and GPTR2 420. Referring now to FIG. 5, Table 500 illustrates the relationship of Output 510, which collectively refers to base-clock-signal 440 and mirror-clock-signal 450, to the inputs at GPTR1 430 and GPTR2 420 for three cases; Case I, Case II, and Case III. Output 510 is illustrated by way of FIGS. 6–8 for each of the three cases. In general, FIGS. 6–8 depict five signals in relation to clock cycles 1–7 depicted at 520, with the five signals being the global clocking signal (clkg) 530, the start-clock signal 410 that is active positive, the mux-sel signal 460 that is used to control the starting and stopping of the mirror-clock-signal for the three cases, the mirror-clock-signal 450 that is active negative, and the base-clock-signal 440 that is active negative. In each of FIGS. 6–8, start-clock 410 is active positive prior to cycle-1.

Regarding Case I, and referring now to FIGS. 5 and 6, GPTR1 430 is set at 1, GPTR2 420 set at 0, and in response, mirror-clock-signal 450 starts and stops one cycle later than base-clock-signal 440, where mirror-clock-signal 450 starts, goes active negative, at cycle-3 and stops at cycle-7.

Regarding Case II, and referring now to FIGS. 5 and 7, GPTR1 430 is set at 1, GPTR2 420 set at 1, and in response, mirror-clock-signal 450 starts one cycle later than base-clock-signal 440 and stops in the same clock cycle as base-clock-signal 440, where mirror-clock-signal 450 starts at cycle-3 and stops at cycle-6.

Regarding Case III, and referring now to FIGS. 5 and 8, GPTR1 430 is set at 0, GPTR2 420 is set at either 1 or 0 (Don't Care (DC)), and in response, mirror-clock-signal 450 starts and stops in the same clock cycle as base-clock-signal 440, where mirror-clock-signal 450 starts at cycle-2 and stops at cycle-6.

The effect of the base-clock and mirror-clock-signals 440, 450 on base-mirror arrangement 200 for each of Cases I, II, and III, will now be discussed and demonstrated with reference to FIGS. 9–15, where FIGS. 9–12 relate to Case I and FIGS. 13–15 relate to Cases II and III. In general, base-unit-clock 440 increments the state of base-unit 210, first staging register 240, third staging register 260, and fourth staging register 270, while mirror-unit-clock 450 increments the state of mirror-unit 220 and second staging register 250. The symbols S1, S2, S3, and S4 refer to the state of the processor elements at the first, second, third, and fourth clocking cycles, and the symbol "0" refers to the initialization state of the processor elements.

Referring now to FIGS. 9–12, where as discussed above in reference to Case I, mirror-unit-clock 450 starts and stops one cycle later than base-unit-clock 440.

Figure 9:
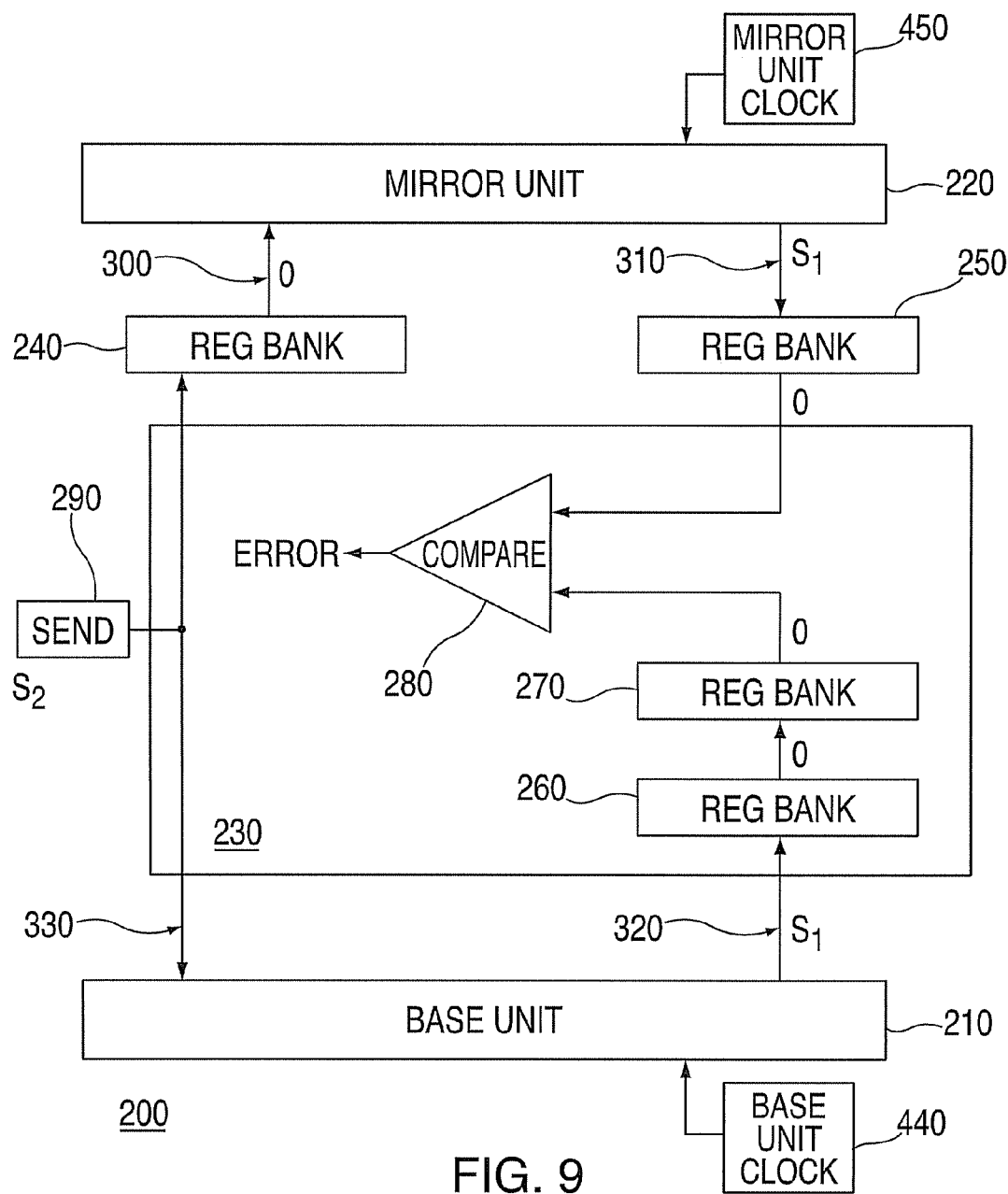
FIGS. 9–15 depict the states of various processor elements in the base-mirror arrangement of FIG. 2 in response to various clocking signals from the exemplary clock controller of FIG. 3.

FIG. 9 depicts the initialization state of all processor elements, where the base and mirror-units are initialized to the same state S1 (seen at the output of base-unit 210 in signal path 320, and at the output of mirror-unit 450 in signal path 310), the staging registers 240, 250, 260, 270 are all initialized to "0" (seen at the output of each staging register), and the send signal 290 is primed to send the next state S2.

Figure 10:
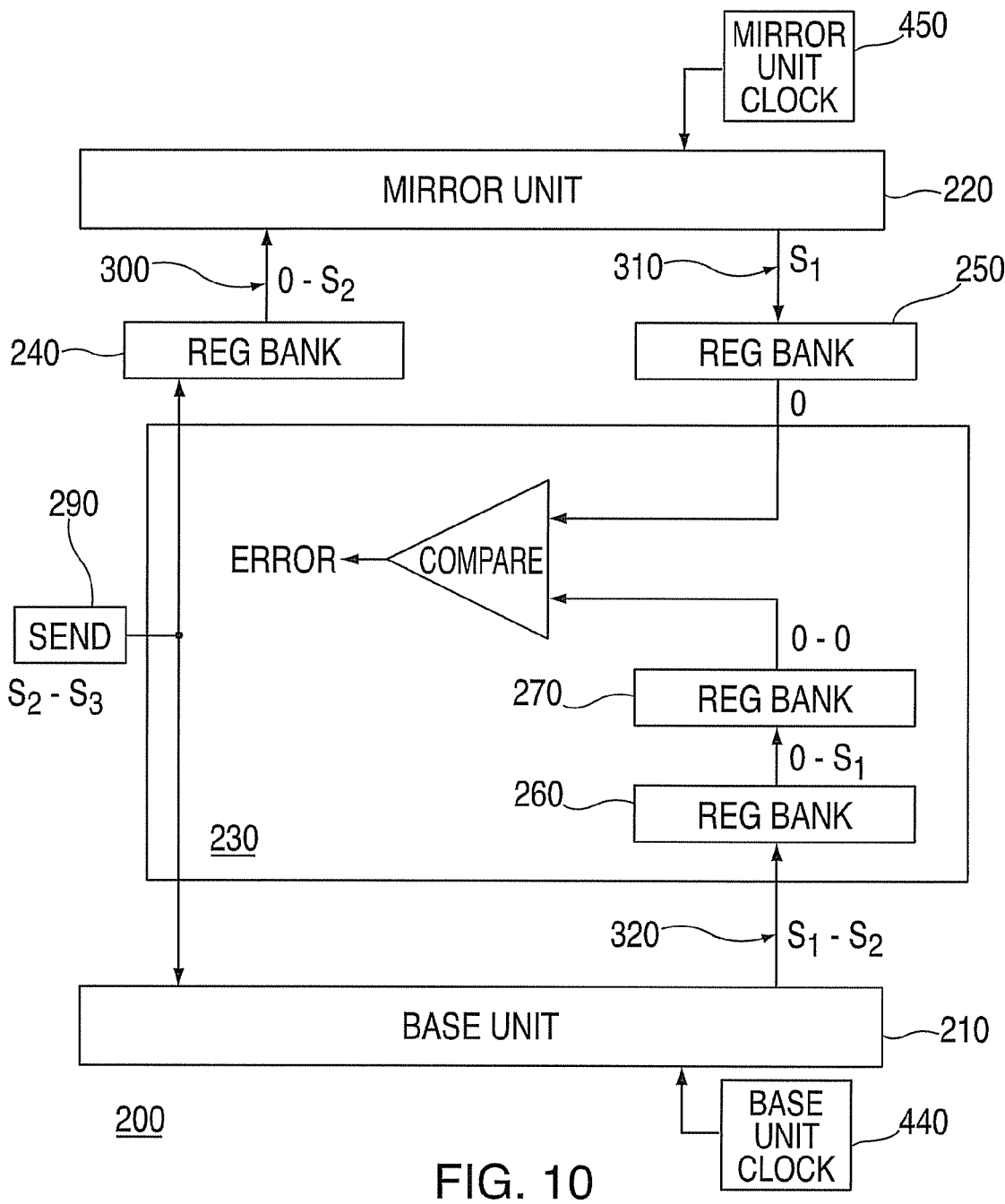

FIG. 10 depicts the state of the processor elements after the first clocking cycle, where elements controlled by base-unit-clock 440 are clocked, but elements controlled by mirror-unit-clock 450 are not because mirror-unit-clock starts one cycle later (see FIG. 6). Accordingly, FIG. 10 depicts the output of base-unit 210 and the output of first staging register 240 being increment to state S2, as received from send signal 290, which is now primed to send the next state S3. The output of third and fourth staging registers 260, 270 are incremented in accordance with the state received from the upstream element to states S1 and 0, respectively. The upstream element of third staging register 260 is base-unit 210, and the upstream element of fourth staging register 270 is third staging register 260. Mirror-unit 220 and second staging register 250 are not clocked, and therefore their output states do not change from FIG. 9.

Figure 11:
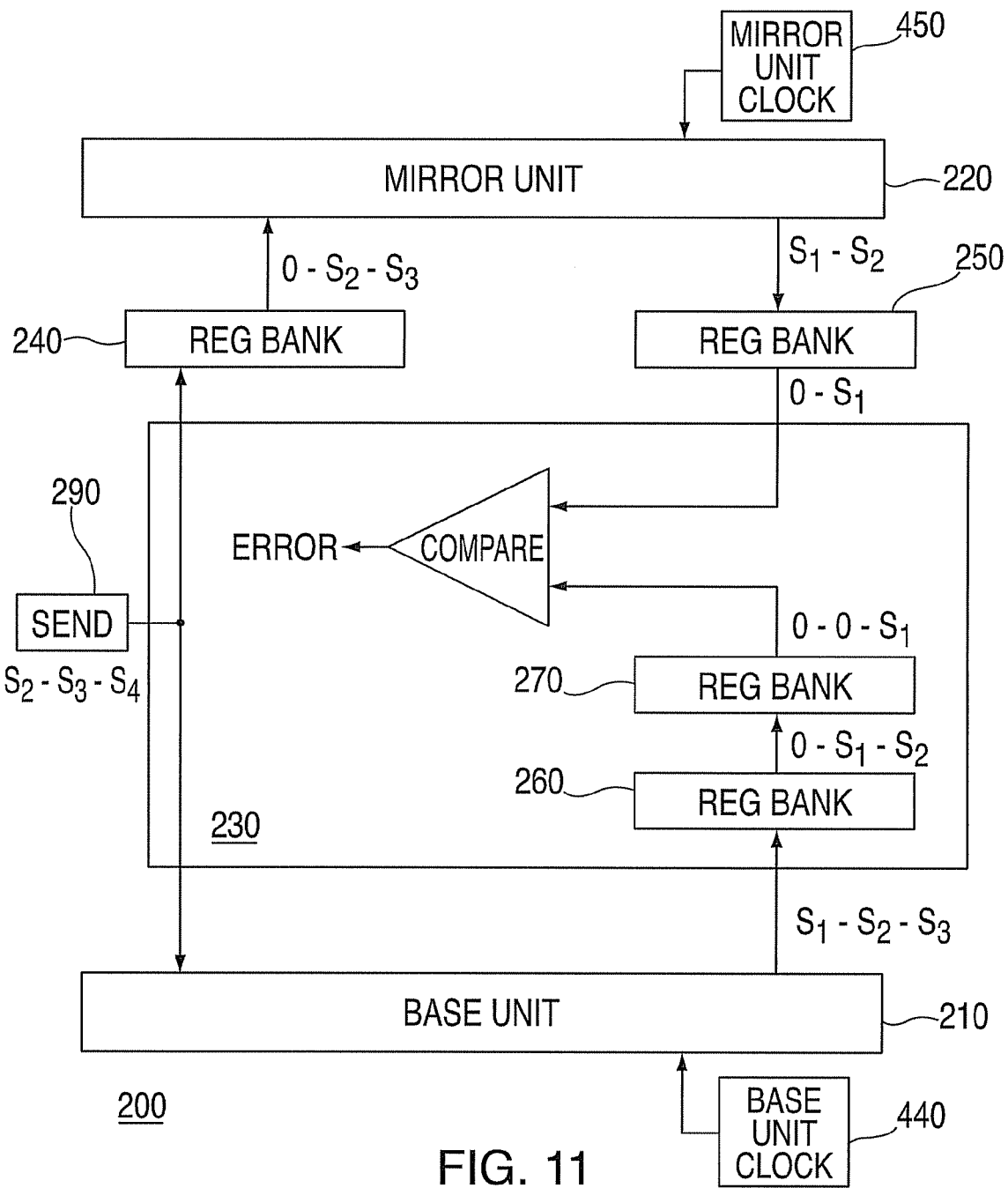

FIG. 11 depicts the state of the processor elements after the next clocking cycle, where all elements are clocked in accordance with FIG. 6. As shown, all processor elements are incremented to the state received from the respective upstream elements. For example, the output of base-unit 210 and the output of first staging register 240 are incremented to state S3, as received from send signal 290, which is now primed to send the next state S4. The output of third and fourth staging registers 260, 270 are incremented to S2 and S1, respectively. The output of mirror-unit 220 and second staging register 250, which are now being clocked, are incremented to S2 and S1, respectively.

Figure 12:
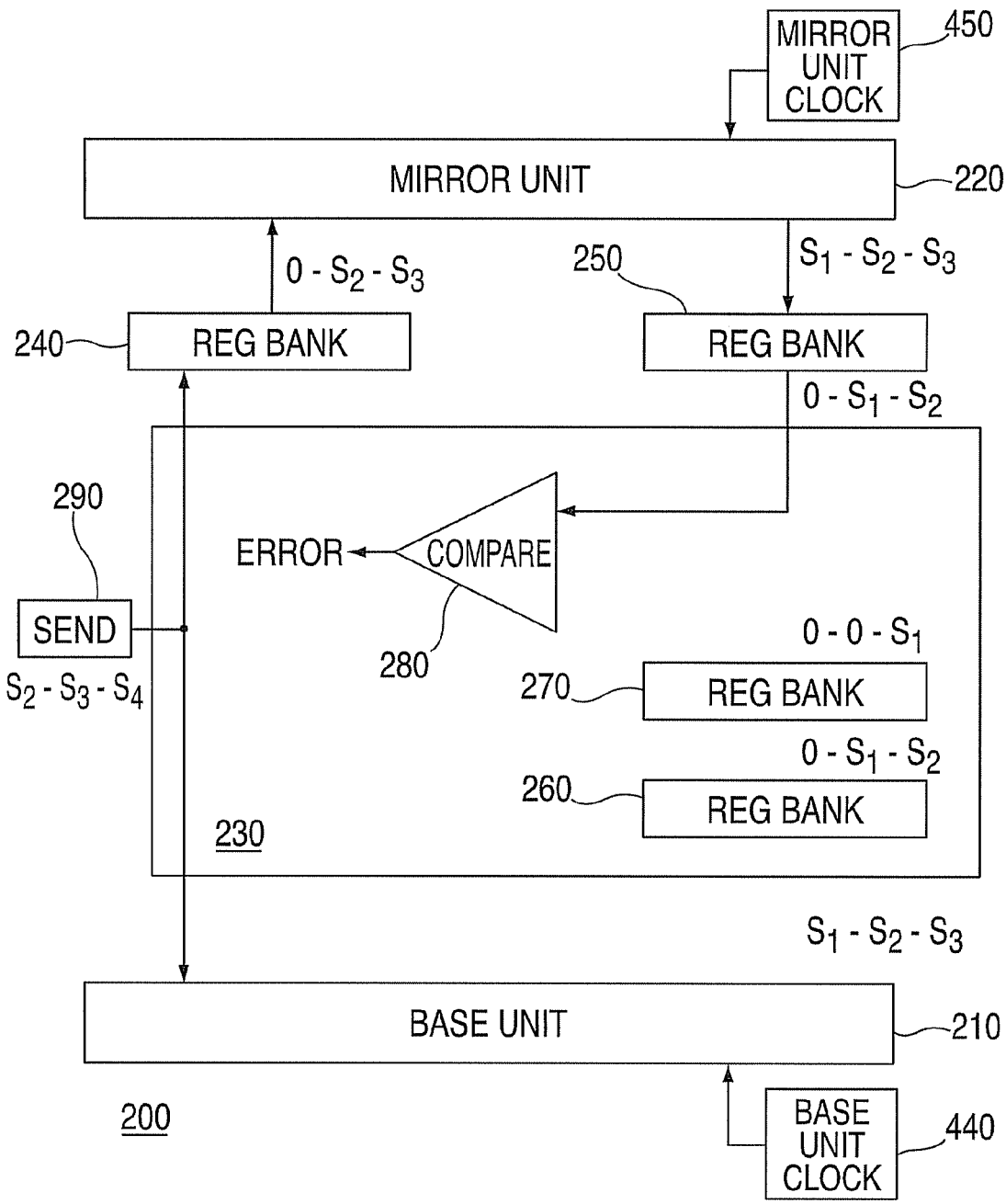

FIG. 12 depicts the state of the processor elements where base-unit-clock 440 has stopped and mirror-unit-clock 450 is clocked for one more cycle, as depicted at cycle-6 of FIG. 6. As will be recalled from the discussion above, Case I involves mirror-unit-clock 450 stopping one cycle later than base-unit-clock 440. Thus, the state of base-unit 210, first staging register 240, third staging register 260, and fourth staging register 270, do not change from the states depicted in FIG. 11. The additional clocking of mirror-unit 220 and second staging register 250 results in their respective outputs being S3 and S2. As can be seen, base-unit 210 and mirror-unit 220 are both at the same state S3. However, as can also be seen, the output of fourth staging register 270 is at state S1 and the output of second staging register 250 is at state S2, and since these outputs provide inputs to comparator 280, a miscompare will be detected, which will now be discussed in reference to Cases II and III, and to FIGS. 13–15.

In general, and with reference to FIGS. 7, 8 and 13–15, Case II involves the situation where mirror-unit-clock 450 starts one cycle after and stops in the same cycle as base-unit-clock 440, which allows base and mirror units 210, 220 to be initialized to the same state, but results in base and mirror units 210, 220 having different states when the clocks are stopped since base-unit 210 received one clock cycle more than mirror-unit 220. However, by using the clocking of Case III after the clocking of Case II, the compare logic at comparator 280 may be employed for single cycle or SOCE (Stop On Count or Error) debugging, as will now be discussed.

Figure 13:
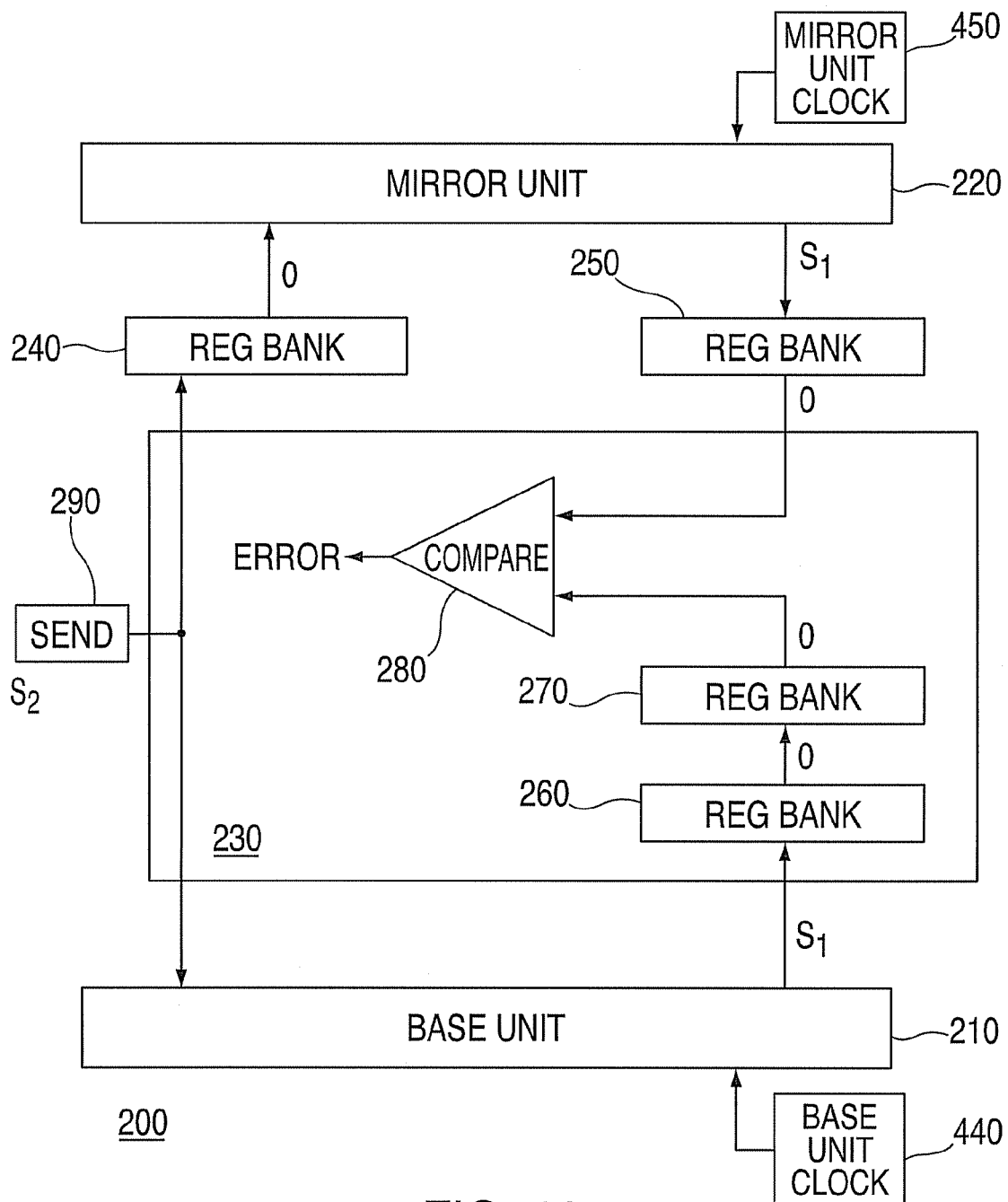
Figure 14:
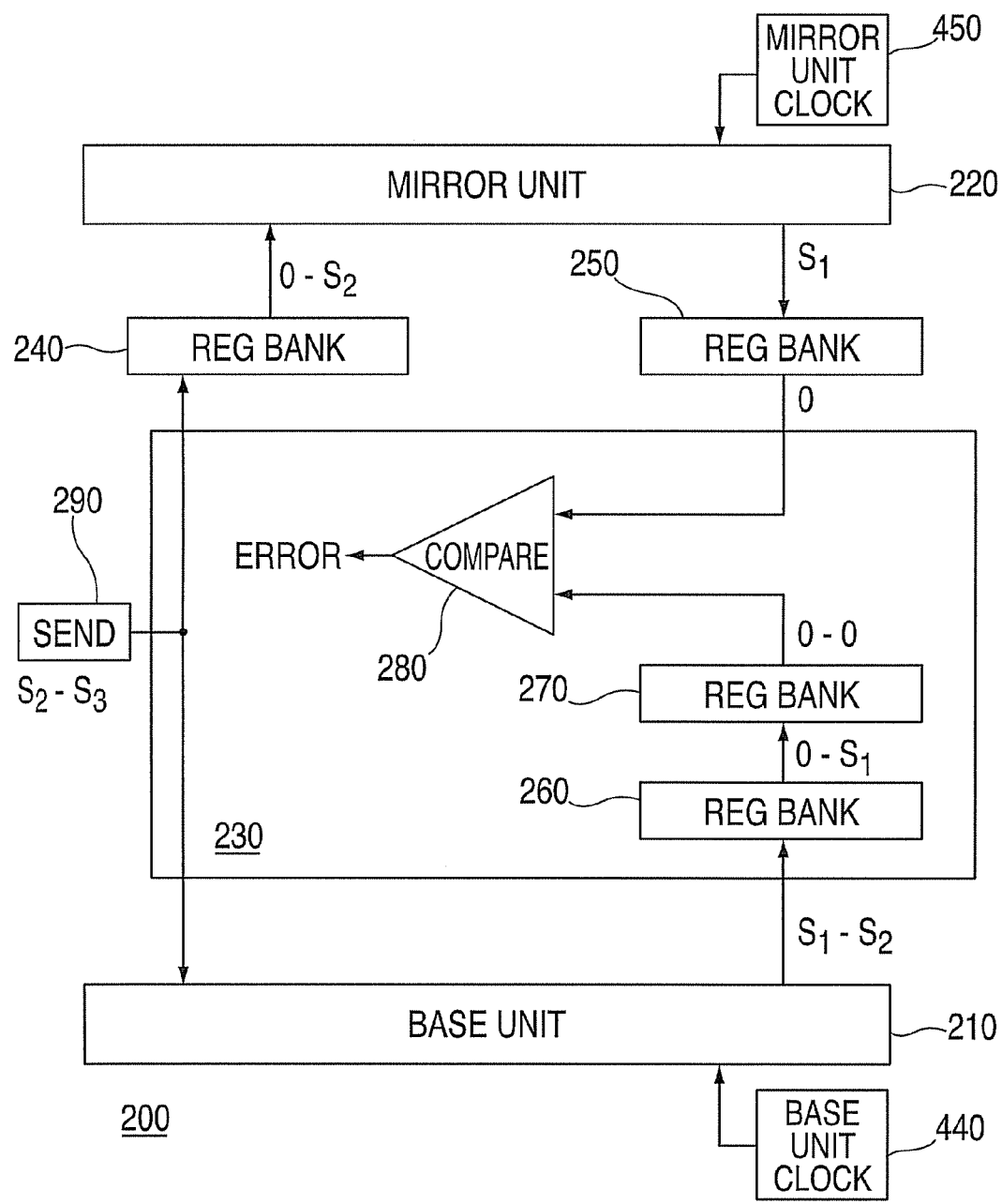

FIGS. 13 and 14 depict similar state arrangements to those depicted in FIGS. 9 and 10, respectively, since both sets of figures reflect the state of the processor elements after initialization and a first clocking cycle, where mirror-unit-clock 450 doesn't start until one cycle after base-unit-clock 440.

Figure 15:
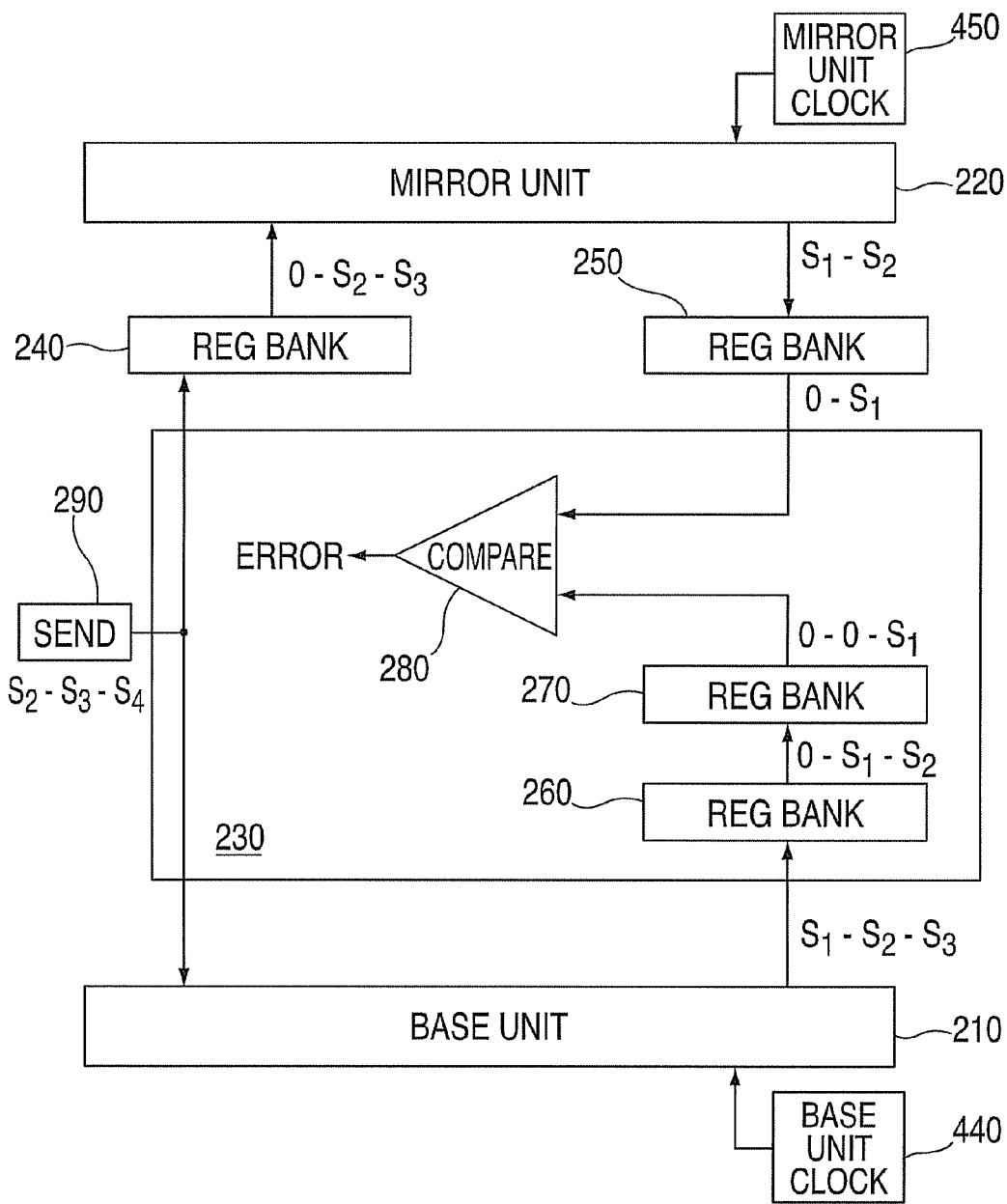

FIG. 15 depicts the state of the processor elements where base-unit-clock 440 and mirror-unit- clock 450 have each been clocked and both have stopped in the same cycle, which is representative of the Case II situation. From this point, if the processor elements are now clocked with base-unit 210 and mirror-unit 220 being started and stopped in the same cycle, which is representative of the Case III situation, all processor elements will increment by one state per clock cycle. Referring now to FIG. 15 specifically, since base-unit 210, first staging register 240, third staging register 260, and fourth staging register 270 have all seen two clock cycles (initialization in FIG. 13, clocking in FIG. 14, and clocking in FIG. 15), their respective states have been incremented twice, with their resulting states being S3, S3, S2, and S1, respectively. In comparison, since mirror-unit 220 and second staging register 250 have only seen one clock cycle (initialization in FIG. 13, dormant in FIG. 14, and clocking in FIG. 15), their respective states have only been incremented once, with their resulting states being S2 and S1, respectively. Since the output of second staging register 250 is S1 and the output of fourth staging register 270 is S1, which are both inputs to comparator 280, comparator 280 will detect a valid compare. Thus, initializing the base and mirror units 210, 220 to the same state, starting mirror-unit 220 one cycle later than base-unit 210, and stopping base and mirror units 210, 220 in the same cycle, results in a valid compare at comparator 280. While it will be noted that base-unit 210 is in state S3 and mirror-unit 220 is in state S2, it will also be noted that the compare pipes are now set up to work correctly when the clocks start to all logic elements in the same cycle (Case III), which is useful for single cycle or SOCE debugging.

By employing an embodiment of clock controller 400 as disclosed herein, mirror-unit-clocks 450 may be started and stopped one cycle after the base-unit-clocks 440, or may be started and stopped in the same cycle as base-unit-clocks 440. In a Case I situation, a scan ring dump would show the base and mirror units 210, 220 to have the same state in their latches, and in a Case II/III situation, while the base and mirror units 210, 220 would no longer be in the same state, the checking logic in R-unit 230 would be valid and ready for continued operation.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A controller for controlling the operation of a clock in a processor having asymmetrically mirrored base-mirror units, comprising:

a start-clock input, a first register input, and a second register input; and a base-unit-clock output for controlling a base-unit-clock and a mirror-unit-clock output for controlling a mirror-unit-clock;

wherein the mirror-unit-clock is adapted to start and stop one cycle later than the base-unit-clock in response to the start-clock being active and the first register input being different from the second register input;

wherein the mirror-unit-clock starts and stops one cycle later than the base-unit-clock in response to the first register input being 1 and the second register input being 0.

2. A controller for controlling the operation of a clock in a processor having asymmetrically mirrored base-mirror units, comprising:

a start-clock input, a first register input, and a second register input; and a base-unit-clock output for controlling a base-unit-clock and a mirror-unit-clock output for controlling a mirror-unit-clock;

wherein the mirror-unit-clock is adapted to start and stop one cycle later than the base-unit-clock in response to the start-clock being active and the first register input being different from the second register input;

wherein the mirror-unit-clock is adapted to start one cycle later than the base-unit-clock and to stop in the same cycle as the base-unit-clock in response to the first and second register inputs being the same.

3. The controller of claim 2, further wherein:

the mirror-unit-clock is adapted to start one cycle later than the base-unit-clock and to stop in the same cycle as the base-unit-clock in response to the first and second register inputs being 1.

4. A controller for controlling the operation of a clock in a processor having asymmetrically mirrored base-mirror units, comprising:

a start-clock input, a first register input, and a second register input; and a base-unit-clock output for controlling a base-unit-clock and a mirror-unit-clock output for controlling a mirror-unit-clock;

wherein the mirror-unit-clock is adapted to start and stop one cycle later than the base-unit-clock in response to the start-clock being active and the first register input being different from the second register input;

wherein the mirror-unit-clock is adapted to start and stop in the same cycle as the base-unit-clock in response to the first register input being 0.

5. A method of operating a clock in a processor having asymmetrically mirrored base-mirror units, comprising:

initializing a base-unit and a mirror-unit of the processor to the same state, the processor having asymmetrically mirrored base-mirror units;

and starting the mirror-unit-clock one clock cycle later than the base-unit-clock;

stopping the mirror-unit-clock and the base-unit-clock in the same clock cycle; and making a valid compare between base and mirror unit signals at a comparator in the absence of a hardware fault.

6. The method of claim 5, wherein the base and mirror units see a different number of clock cycles in response to both the mirror-unit-clock and the base-unit-clock being stopped in the same clock cycle.

7. A combination of a clock controller and a processor responsive thereto, the processor comprising:

a base-unit for providing an output signal in response to an input signal;

a mirror-unit for providing an output signal in response to the input signal, the mirror-unit being a duplicate of the base-unit;

a first staging register disposed at the input to the mirror-unit for delaying the input signal thereto by at least one clock cycle;

a second staging register disposed at the output of the mirror-unit for delaying the output signal therefrom by at least one clock cycle;

a recovery-unit in signal communication with the base and mirror units, the recovery unit having a comparator for comparing the output signals of the base and mirror units, the recovery unit further having third and fourth staging registers serially disposed between the output of the base-unit and the input of the comparator for delaying the input signal thereto by at least two clock cycles; and the clock controller comprising:

a clock input, a first test register input, and a second test register input;

a base-unit-clock output for controlling a base-unit-clock; and a mirror-unit-clock output for controlling a mirror-unit-clock;

wherein the base-unit-clock is adapted to increment the state of base-unit, the first staging register, the third staging register, and the fourth staging register; and the mirror-unit-clock is adapted to increment the state of the mirror-unit and the second staging register.

8. The combination of claim 7, further wherein:

the base-unit and mirror-unit are initialized to the same state; and each of the staging registers are initialized to 0.

9. The combination of claim 7, further wherein:

the mirror-unit-clock is adapted to start and stop one cycle later than the base-unit-clock in response to the first test register input being different from the second test register input; the mirror-unit-clock is adapted to start one cycle later than the base-unit-clock and stop in the same cycle as the base-unit-clock in response to the first and second test register inputs being the same; and the mirror-unit-clock is adapted to start and stop in the same cycle as the base-unit-clock in response to the first test register input being 0.

* * * * *